(12) United States Patent
Zhou et al.

(10) Patent No.: US 9,436,732 B2
(45) Date of Patent: Sep. 6, 2016

(54) SYSTEM AND METHOD FOR ADAPTIVE VECTOR SIZE SELECTION FOR VECTORIZED QUERY EXECUTION

(71) Applicant: FutureWei Technologies, Inc., Plano, TX (US)

(72) Inventors: Qingqing Zhou, Santa Clara, CA (US); Guogen Zhang, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 759 days.

(21) Appl. No.: 13/798,680

(22) Filed: Mar. 13, 2013

(65) Prior Publication Data

US 2014/0280031 A1 Sep. 18, 2014

(51) Int. Cl.
*G06F 17/30* (2006.01)

(52) U.S. Cl.
CPC .................. *G06F 17/30463* (2013.01)

(58) Field of Classification Search
CPC ............ G06F 17/30867; G06F 17/3053; G06F 17/30864; G06F 17/30554; G06F 3/04842; G06F 3/0482; G06F 17/30663; G06F 17/16; G06F 17/30463; G06F 17/30; G06F 17/30011; G06F 17/30598; G06F 17/3087; G06F 19/321; G06F 17/30247
USPC ........................................................ 707/718
See application file for complete search history.

(56) References Cited

U.S. PATENT DOCUMENTS 5,960,428 A * 9/1999 Lindsay ............ G06F 17/30466
707/E17.108

8,296,303 B2 * 10/2012 Navas ............... G06F 17/30516
707/747
2002/0093522 A1 * 7/2002 Koskas ............. G06F 17/30595
715/700

(Continued)

FOREIGN PATENT DOCUMENTS

WO       2013009503 A2     1/2013

OTHER PUBLICATIONS

Marcin Zukowski Niels Nes Peter Boncz—"DSM vs. NSM: CPU Performance Tradeoffs in Block-Oriented Query Processing"—Published in: Proceeding DaMoN '08 Proceedings of the 4th international workshop on Data management on new hardware—Jun. 13, 2008, Vancouver, Canada—pp. 47-54.*

(Continued)

*Primary Examiner* — Anh Ly
(74) *Attorney, Agent, or Firm* — Futurewei Technologies, Inc.

(57) ABSTRACT

System and method embodiments are provided for adaptive vector size selection for vectorized query execution. The adaptive vector size selection is implemented in two stages. In a query planning stage, a suitable vector size is estimated for a query by a query planner. The planning stage includes analyzing a query plan tree, segmenting the tree into different segments, and assigning to the query execution plan an initial vector size to each segment. In a subsequent query execution stage, an execution engine monitors hardware performance indicators, and adjusts the vector size according to the monitored hardware performance indicators. Adjusting the vector size includes trying different vector sizes and observing related processor counters to increase or decrease the vector size, wherein the vector size is increased to improve hardware performance according to the processor counters, and wherein the vector size is decreased when the processor counters indicate a decrease in hardware performance.

19 Claims, 4 Drawing Sheets

(56) References Cited

U.S. PATENT DOCUMENTS

| | | | |
|---|---|---|---|
| 2003/0158842 A1* | 8/2003 | Levy | G06F 17/30445 707/E17.014 |
| 2006/0294075 A1* | 12/2006 | Simic | G06F 17/30433 707/E17.032 |
| 2008/0033960 A1* | 2/2008 | Banks | G06F 17/30595 707/E17.039 |
| 2010/0125584 A1* | 5/2010 | Navas | G06F 17/30516 707/747 |
| 2010/0191720 A1* | 7/2010 | Al-Omari | G06F 17/30463 707/718 |
| 2010/0306188 A1* | 12/2010 | Cunningham | G06F 17/30463 707/713 |
| 2011/0219208 A1* | 9/2011 | Asaad | G06F 15/76 712/12 |
| 2012/0078939 A1 | 3/2012 | Chen et al. | |
| 2012/0260057 A1* | 10/2012 | Eyerman | G06F 1/3203 711/167 |
| 2014/0129530 A1* | 5/2014 | Raufman | G06F 7/78 707/693 |

OTHER PUBLICATIONS

Juliusz Sompolski et al.—" Vectorization vs. Compilation in Query Execution"—Published in: Proceeding DaMoN '11 Proceedings of the Seventh International Workshop on Data Management on New Hardware—Jun. 13, 2011, Athens, Greece.—pp. 33-40.*

Boncz et al., "MonetDB/x100: Hyper-Pipeling Execution," CWI Kruislaan 413, Amsterdan, The Netherlands, Proceedings of the 2005 CIDR Conference, (no month, 2005), pp. 225-237.

International Search Report received in PCT/CN2014/073286, mailed Jun. 18, 2014, 11 pages.

* cited by examiner

SYSTEM AND METHOD FOR ADAPTIVE VECTOR SIZE SELECTION FOR VECTORIZED QUERY EXECUTION

TECHNICAL FIELD

The present invention relates generally to database systems and methods, in particular embodiments, to a system and method for adaptive vector size selection for vectorized query execution.

BACKGROUND

Vectorized query execution is a significant performance improvement on current row pipeline execution engines, which are used by some traditional databases. In the traditional pipeline execution engine, the data unit between each iterator is a row, while the vectorized query execution uses a vector. A benefit of using a vector as a data unit is to amortize the per-row overhead to a vector of rows. One key factor of vectorized query execution is the vector length or size, where both too small and too large sizes can hurt performance. In general, the larger the vector size, the more per-row overhead can be amortized leading to better performance. However, a larger size vector needs more memory to store it, which can incur cache misses and hence hurt performance. There is no unique best setting for vector size as it is also related to the query and hardware settings. The optimal length can be different for different query and different hardware settings. For example, a larger L1 cache allows a larger size vector. There is a need for a method that selects the optimal vector size for performance according to software and hardware needs.

SUMMARY OF THE INVENTION

In accordance with an embodiment, a method for adaptive vector size selection for vectorized query execution includes, determining at a query planner module a vector size suitable for a query plan tree during a query planning time, monitoring at a query execution engine hardware performance indicators during a query execution time for the query plan tree, and adjusting the vector size according to the monitored hardware performance indicators.

In accordance with another embodiment, a method for adaptive vector size selection for vectorized query execution includes collecting, at a query execution engine, processing unit counters during a vectorized query execution for a query plan tree, modifying a vector size for processing vectors of the vectorized query execution according to the collected processing unit counters, and upon determining satisfactory performance or timing out of the vectorized query execution, determining whether the modified vector size is substantially different than an initial vector size used at a start of the vectorized query execution. The method further includes, upon determining that the modified vector size is substantially different than the initial vector size, sending the modified vector size to an optimizer for executing subsequent query plan trees similar to the query plan tree.

In yet another embodiment, an apparatus for adaptive vector size selection for vectorized query execution includes a processor and a computer readable storage medium storing programming for execution by the processor. The programming includes instructions to collect processor counters at run-time during a vectorized query execution for a query plan tree, modify a vector size for processing vectors of the vectorized query execution according to the collected processor counters, and upon determining satisfactory performance or timing out of the vectorized query execution, determine whether the modified vector size is substantially different than an initial vector size used at a start of the vectorized query execution. The instructions further include, upon determining that the modified vector size is substantially different than the initial vector size, selecting the modified vector size to start executing subsequent query plan trees similar to the query plan tree.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for adaptive vector size selection for vectorized query execution. The adaptive vector size selection is implemented in two stages. In a query planning stage, a suitable vector size is estimated for a query, e.g., by a query planner. The planning stage includes analyzing a query plan tree, segmenting the tree into different segments, and assigning to the query execution plan an initial vector size to each segment, for instance based on an empirical formula. In a subsequent query execution stage, an execution engine adjusts the estimated value to improve performance. In the execution stage, the query plan execution is started with the estimated vector size of the planning stage. The vectors in the first several execution rounds are used for testing by trying different vector sizes and observing related processor (or CPU) counters to increase or decrease the vector size, and hence achieve an optimal size.

In the planning stage, the planner can analyze a query (execution) plan tree, split the tree into different segments, and assigns an initial vector size based on an empirical formula to each segment. For instance, when the planner gets the query plan tree, the planner splits the plan tree into segments, where the boundaries between segments can be decided by any adjacent non-pipeline iterators in the plan tree. The planner then decides one a best or suitable vector size for each of the segments.

Figure 1:
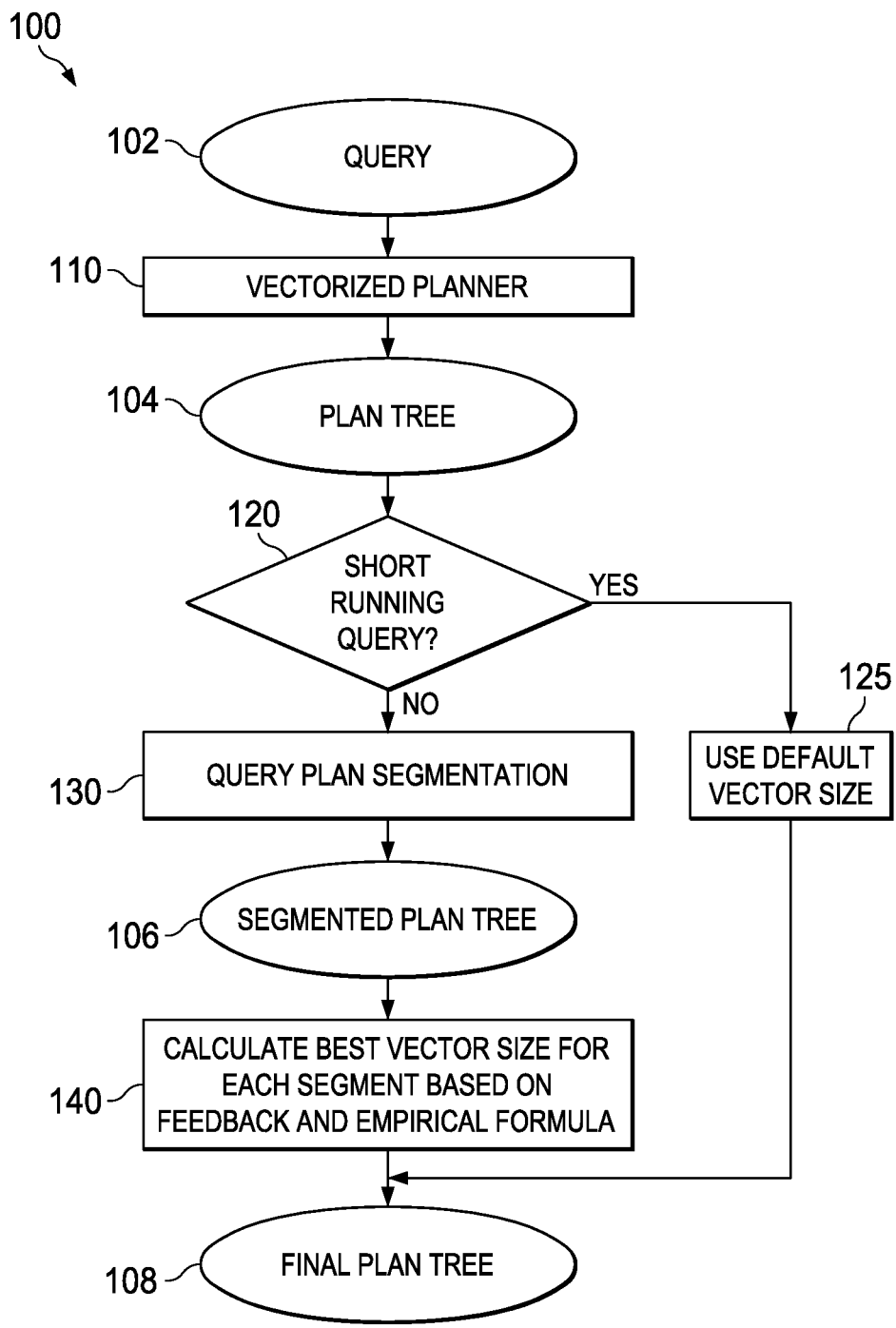
FIG. 1 illustrates an embodiment method for query segmentation and initial vector size setting.

FIG. 1 shows an embodiment method 100 for query or plan segmentation and initial vector size setting. The method 100 is implemented in a planning stage prior to the query execution stage and may include generating the query execution plan. At block 110, a vectorized planner generates a plan tree 104 for a query 102. At decision block 120, the method 100 (e.g., the planner) determines whether the query is a relatively short query. If the query is a short query, then the method 100 proceeds to block 125, where a default vector size is used for the final plan tree 108. This check for "short running query" is to prevent regressions on small queries. Otherwise, the method 100 proceeds to block 130, where query plan segmentation is implemented to provide a segmented plan tree 106. Next at block 140, a best or optimal vector size is calculated for each segment of the plan tree based on feedback and/or empirical formula to provide the final plan tree 108. The feedback may include previously determined and used vector sizes for similar query plans, segments, hardware, or combinations thereof.

Figure 2:
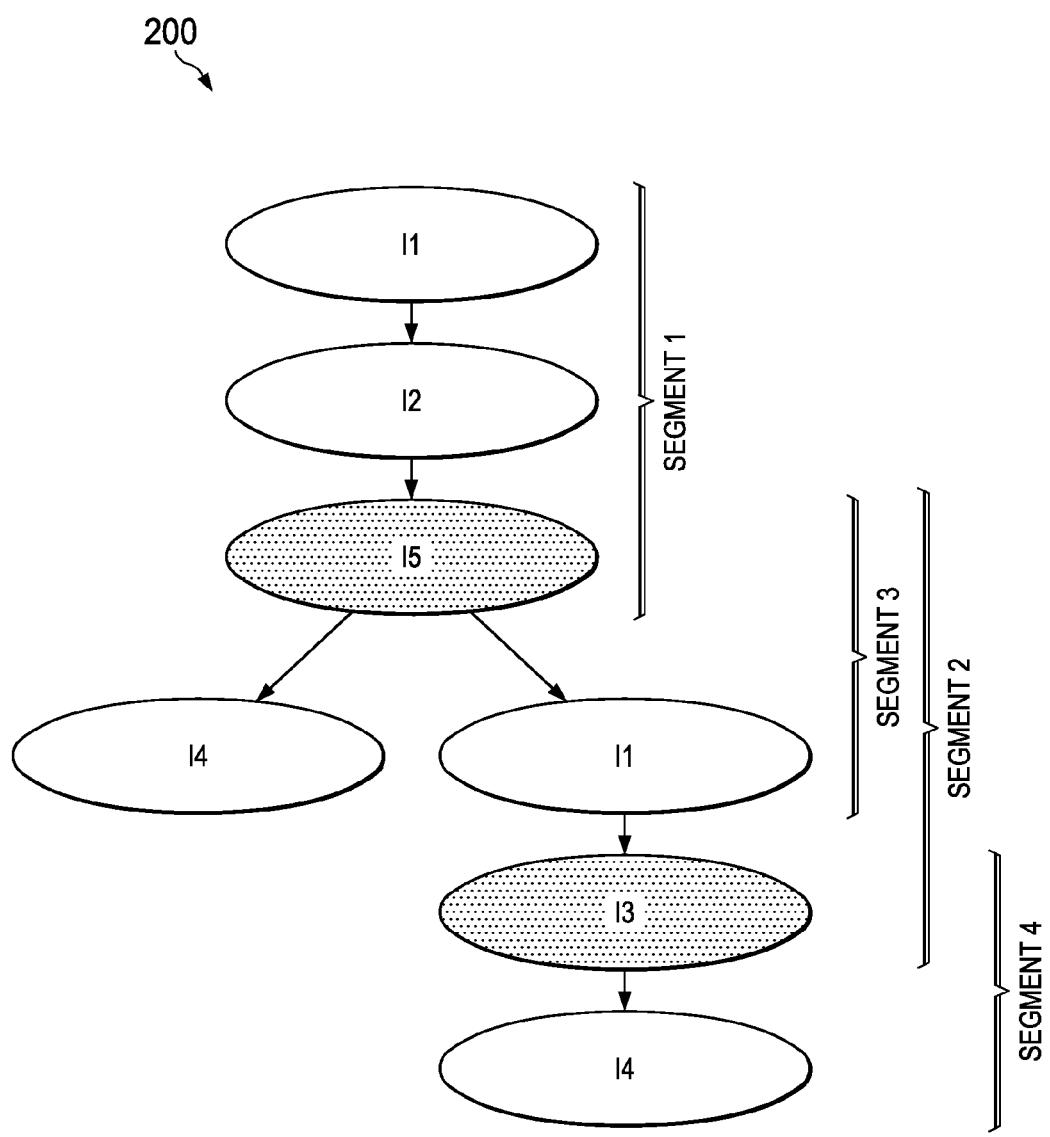
FIG. 2 illustrates an example of a plan segmentation.

FIG. 2 shows an example of a plan segmentation 200. The plan may be segmented during the planning phase, for instance as part of the method 100. The plan is split into four segments by the two non-pipelined iterators I3 and I5 according to Table 1 below. The iterator I5 is also a join point, where each branch corresponds to a different segment. Table 1 illustrates some characteristics of some exemplary iterators that can be used for a plan tree for query execution. The integer N represents the vector size. For the attribute "Pipelined", "No" means that the corresponding iterator may not consume all output of a child iterator before the iterator can output. Pipelined iterator examples include scan, stream aggregation, filter, adapters, and others. Non-pipelined iterator examples include hash aggregation and hash join (or hash join build if hash join is split into build iterator and probe iterator). The four segments of the plan in FIG. 2 include segment 1 (with I1, I2, and I5), segment 2 (with I1, I3 and I5), segment 3 (with I4 and I5), and segment 4 (with I3, and I4).

TABLE 1

Characteristics of plan iterators.

| Iterator | Input Size | Output Size | Processing Size | Other overhead | Pipelined |
|---|---|---|---|---|---|
| I1 | N | N | P1 | 0 | Yes |
| I2 | N | N | 0 | O2 | Yes |
| I3 | N | N | P3 | 0 | No |
| I4 | N | N | 0 | O4 | Yes |
| I5 | 2 * N | N | P5 | O5 | No |

In an embodiment, the memory usage of each iterator can be based on a formula such as:

$$\text{MemoryUsage(iterator)} = \text{InputSize} + \text{OutputSize} + \text{ProcessingSize} + \text{Overhead}. \quad (1)$$

According to the formula, the child iterator's output is the current iterator's input, so the overall memory usage of a segment of iterators may be:

$$\text{SegmentMemoryUsage(iterators)} = \text{InputSize} + \text{SUM}(\text{OutputSize} + \text{ProcessingSize} + \text{Overhead}). \quad (2)$$

To achieve the best or optimal performance, the best or optimal SegementMemoryUsage value may be less than the L1 cache size, if possible. If not, the value can match to the smallest possible level of cache. Based on the above formula, the initial vector size BestFitSize can be determined. The vector size can be at least some value (constNumber) to amortize the cost of per row overhead. Hence, the final format may be as follows:

$$\text{BestVectorSize} = \text{MAX}(\text{constNumber}, \text{BestFitSize}). \quad (3)$$

In above formula (1), there are some planner estimated memory usages, such as the hash table size. If the hash table turns out to be larger than the estimated size, the query execution with the current estimated vector size may end up thrashing the caches. Thus, some execution stage feedback is needed to monitor performance characteristics during the execution stage.

Figure 3:
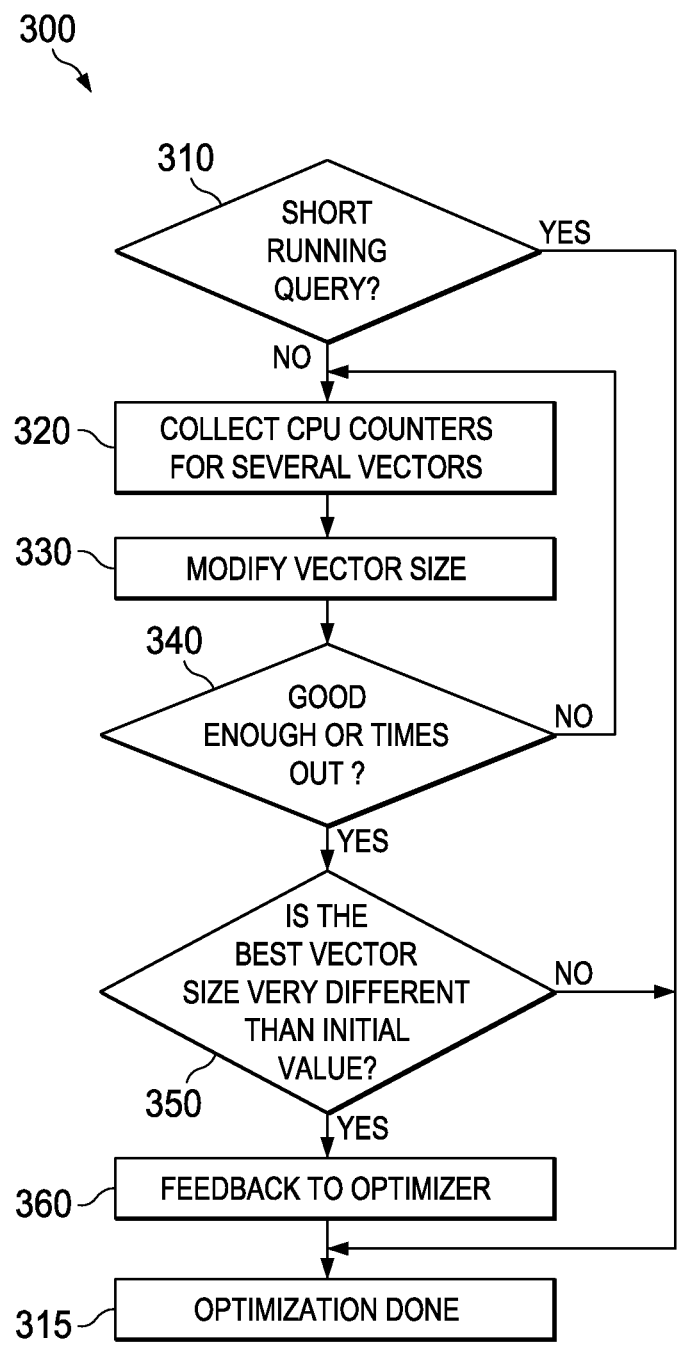
FIG. 3 illustrates an embodiment method for adaptive vector size selection in execution time.

FIG. 3 illustrates an embodiment method 300 for adaptive vector size selection in execution time. The method 300 is implemented in an execution stage following a planning stage, e.g., after implementing the method 100. The method 300 includes tuning or adjusting an initial vector size, e.g., selected in the method 100 (during the planning stage), according to the processor or CPU execution time feedback. The CPU building counters (PMC) are used to provide feedback for execution performance. There may be several counters (e.g., hundreds of counters) that can be monitored for this purpose. Table 2 below shows some selection of the counters that can be monitored, for instance.

TABLE 2

CPU counters that can be monitored during executing stage.

| CPU Counter | Meaning |
|---|---|
| L1D.miss | L1 data cache miss counter |
| L2.miss | L2 cache miss counter |
| LLC.miss | Last level cache miss counter |
| Instructions | Instructions retired |
| Cycles | CPU cycles |

When a vector size N is too large for executing a query, higher cache misses are expected, but fewer instructions may be retired. When the vector size N is too small for executing the query, less cache misses are expected, but more instructions may be retired. Therefore, the rule adopted for vector size tuning is to increase the vector size until excessive cache misses are observed. To reduce cache misses, the vector size is decreased if the cache misses can be reduced. For example, a step unit for increasing or decreasing the vector size may be set to 10% of current size.

At decision block 310, the method 300 (e.g., during the plan execution) determines whether the query is a relatively short query. If the query is a short query, then the method 300 proceeds to block 315, where the optimization process (or the method 300) is ended. This check for "short running query" is to prevent regressions on small queries. Otherwise, the method 300 proceeds to block 320, where the CPU counters for several vectors are collected. Next at block 330, the vector size is modified based on the collected counters status. The size may be increased unless the counters indicate a decrease in performance (in comparison to previously collected counter status). If performance is decreased, the size is decreased to increase the performance. At decision block 340, the method 300 determines whether the performance (based on the monitored counters) is sufficiently good or whether the monitoring times out. The method 300 returns to block 320 to continue monitoring the counters and modifying the vector size accordingly until any of the conditions in block 34 is met. The method 300 then proceeds to decision block 350, where the method 300 determines whether the modified vector size is substantially different than the initial value (e.g., from the planning stage). If the modified vector size is substantially different than the initial size, then the method 300 proceeds to block 360, where this information (with the modified vector size) is sent to the optimizer. Otherwise, the method 300 proceeds to block 315 to end the optimization process. The optimizer can then adjust the vector size accordingly, e.g., for the next round of the query run. Thus, the vectors processed in subsequent similar query plan executions may use the modified vector size.

Below is an embodiment algorithm (e.g., in C programming) for adaptive vector size selection in execution time. For example, the algorithm can be implemented as part of the method 300.

```
1   /* Init */
2   #tried = 0;
3   C1 = #cycles by setting N=1.1 * N;
4   C2 = #cycles by setting N=0.9 * N;
5   Increase = C1 < C2 ? true : false;
6   /* tuning loop */
7   collect CPU counters for several iterations;
8   if (#cycles < previous #cycles) /* better performance */
9       if (increase &&
10          #insts < previous #insts) /* verify desired effect */
11         N = 1.1*N;
12      if (!increase &&
13          #cache.miss < previous #cache.miss) /* verify desired effect
    */
14         N = 0.9*N;
15     if (#tried++ < 10 && N != previous N)
16         goto 6;
17  return;   /* done */
```

Figure 4:
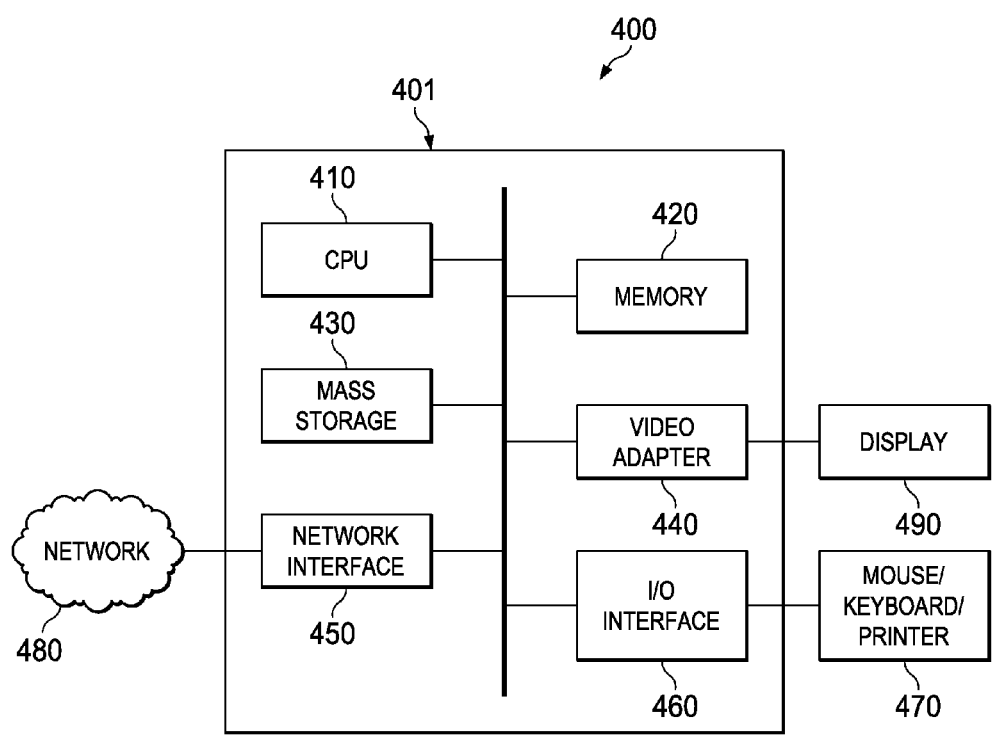
FIG. 4 is a block diagram of a processing system that can be used to implement various embodiments.

FIG. 4 is a block diagram of a processing system 400 that can be used to implement various embodiments. For example, the processing system 400 may be part of or coupled to a network component, such as a router, a server, or any other suitable network component or apparatus. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an I/O interface 460 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 460 provide interfaces to couple external input and output devices to the processing unit. As illustrated, examples of input and output devices include a display 490 coupled to the video adapter 440 and any combination of mouse/keyboard/printer 470 coupled to the I/O interface 460. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptive vector size selection for vectorized query execution, the method comprising:
   during a query planning time, at a query planner module, generating a query plan tree;
   splitting the query plan tree into a plurality of segments;
   calculating an initial vector size for each of the plurality of segments;
   assigning a vector size to each of the plurality of segments, wherein assigning the vector size to each of the plurality of segments comprises assigning the initial vector size to each of the plurality of segments;
   during a query execution time for the query plan tree, at a query execution engine, monitoring execution performance; and
   adjusting the vector size vector size according to the monitored execution performance.

2. The method of claim 1, further comprising:
   calculating an initial vector size for each of the plurality of segments during the query planning time;
   wherein assigning the vector size to each of the plurality of segments includes assigning an initial vector size to each of the plurality of segments.

3. The method of claim 2, wherein calculating the initial vector size comprises calculating the initial vector size according to an empirical formula or according to optimized vector sizes for similar query plans, segments or combination thereof.

4. The method of claim 1, wherein adjusting the vector size during the query execution time includes trying different vector sizes and observing related processor counters to increase or decrease the vector size.

5. The method of claim 4, wherein the vector size is increased until cache misses exceed an acceptable cache miss threshold; and wherein the vector size is decreased when instructions retired exceed an acceptable instructions retired threshold.

6. The method of claim 1 further comprising sending the adjusted vector size to an optimizer for executing subsequent query plan trees similar to the query plan tree.

7. The method of claim 1, wherein the query plan tree includes a plurality of pipeline and non-pipeline iterators, and wherein the query plan tree is segmented at each non-pipeline iterator.

8. A method for adaptive vector size selection for vectorized query execution, the method comprising:
   collecting, at a query execution engine, processing unit counters during a vectorized query execution for a query plan tree, wherein the query plan tree is split into a plurality of segments;
   calculating an initial vector size for each of the plurality of segments;
   assigning a vector size to each of the plurality of segments, wherein assigning the vector size to each of the plurality of segments comprises assigning the initial vector size to each of the plurality of segments;
   modifying the vector size for at least one of the plurality of segments according to the collected processing unit counters;
   upon determining satisfactory performance or timing out of the vectorized query execution, determining whether the modified vector size is substantially different than an initial vector size used at a start of the vectorized query execution; and
   upon determining that the modified vector size is substantially different than the initial vector size, sending the modified vector size to an optimizer for executing subsequent query plan trees similar to the query plan tree.

9. The method of claim 8, wherein modifying the vector size for at least one of the plurality of segments according to the collected processing unit counters comprises:
   increasing the vector size until cache misses exceed an acceptable cache miss threshold; and
   decreasing the vector size to reduce the cache misses.

10. The method of claim 8, wherein modifying the vector size for at least one of the plurality of segments according to the collected processing unit counters comprises:
    upon detecting more cache misses than an acceptable cache miss threshold, decreasing the vector size; and
    upon detecting more instructions retired beyond an acceptable instructions retired threshold, increasing the vector size.

11. The method of claim 8 further comprising:
    determining whether the query plan tree is a short tree that includes less than a pre-determined number of iterators or segments; and
    upon determining that the query plan tree is a short tree, skipping the vector size modification.

12. The method of claim 8, wherein calculating the initial vector size for each of the plurality of segments-comprises calculating the initial vector size according to an empirical formulation or according to optimized vector sizes for similar query plans, segments or combinations thereof.

13. The method of claim 12, wherein calculating the initial vector size according to the empirical formulation includes:
    calculating memory usage per iterator as a sum of input data size to the iterator, output data size, processing size, and overhead;
    calculating memory usage per segment as a sum of memory usage for all iterators of the segment;
    selecting a best fit size for the vector as a minimum between the memory usage per segment and a data cache size; and
    selecting the initial vector size as a minimum between the best fit size and a pre-determined value to amortize cost per row overhead.

14. The method of claim 8, wherein the query plan tree includes a plurality of pipeline and non-pipeline iterators, and wherein the query plan tree is segmented at each non-pipeline iterator.

15. An apparatus configured for adaptive vector size selection for vectorized query execution, the apparatus comprising:
    a processor; and
    a computer readable storage medium storing programming for execution by the processor, the programming including instructions to:
    collect processor counters at run-time during a vectorized query execution for a query plan tree, wherein the query plan tree is split into a plurality of segments;
    calculate an initial vector size for each of the plurality of segments;
    assign a vector size to each of the plurality of segments, wherein assigning the vector size to each of the plurality of segments comprises assigning the initial vector size to each of the plurality of segments;
    modify the vector size for at least one of the plurality of segments according to the collected processing unit counters;
    upon determining satisfactory performance or timing out of the vectorized query execution, determine whether the modified vector size is substantially different than an initial vector size used at a start of the vectorized query execution; and
    upon determining that the modified vector size is substantially different than the initial vector size, selecting the modified vector size to start executing subsequent query plan trees similar to the query plan tree.

16. The apparatus of claim 15, wherein the collected processing unit counters include at least one of a cache miss counter for at least one data cache, a last level cache miss counter, a counter of instructions retired, or a counter of processor cycles.

17. The apparatus of claim 15, wherein the query plan tree includes a plurality of pipeline and non-pipeline iterators, and wherein the query plan tree is segmented at each non-pipeline iterator.

18. The apparatus of claim 15, the programming includes further instructions to:
    calculate the initial vector size for each of the plurality of segments; and
    wherein the instruction to assign the vector size for each of the plurality of segments comprises assigning an initial vector size for each of the plurality of segments.

19. The apparatus of claim 15, wherein the instruction to modify the vector size for at least one of the plurality of segments comprises:
    upon detecting cache misses exceeding an acceptable cache miss threshold, decreasing the vector size; and
    upon detecting instructions retired exceeding an acceptable instructions retired threshold, increasing the vector size.

* * * * *